United States Patent
Yamamoto et al.

[11] Patent Number: 5,829,797
[45] Date of Patent: Nov. 3, 1998

[54] THREADED JOINT FOR OIL WELL PIPES

[75] Inventors: Miyuki Yamamoto, Ikeda; Akira Narita, Osaka; Jun Maeda, Ashiya, all of Japan

[73] Assignee: Sumitomo Metal Industries, Ltd., Osaka, Japan

[21] Appl. No.: 561,587

[22] Filed: Nov. 21, 1995

[30] Foreign Application Priority Data

Nov. 22, 1994 [JP] Japan .................................. 6-288272
Aug. 18, 1995 [JP] Japan .................................. 7-210625

[51] Int. Cl.$^6$ ..................................................... F16L 15/00
[52] U.S. Cl. .......................... 285/333; 285/334; 285/355; 285/390
[58] Field of Search .................................... 285/333, 334, 285/355, 390

[56] References Cited

U.S. PATENT DOCUMENTS

| | | | |
|---|---|---|---|
| Re. 30,647 | 6/1981 | Blose | 285/334 |
| 2,206,166 | 7/1940 | Dunn | 285/334 |
| 3,050,318 | 8/1962 | Van Der Wissel | 285/334 |
| 3,129,963 | 4/1964 | Robbins | 285/334 |
| 3,224,799 | 12/1965 | Blose et al. | 285/334 |
| 4,398,756 | 8/1983 | Duret et al. | 285/334 |
| 4,494,777 | 1/1985 | Duret | 285/334 |
| 4,508,375 | 4/1985 | Patterson et al. | 285/334 |
| 4,550,937 | 11/1985 | Duret | 285/114 |
| 4,865,364 | 9/1989 | Nobileau | |
| 4,917,409 | 4/1990 | Reeves | 285/334 |
| 5,007,665 | 4/1991 | Bovisio et al. | 285/334 |
| 5,092,635 | 3/1992 | DeLange et al. | 285/334 |
| 5,419,595 | 5/1995 | Yamamoto et al. | 285/334 |

FOREIGN PATENT DOCUMENTS

| | | |
|---|---|---|
| 0 104 720 | 4/1984 | European Pat. Off. . |
| 0 108 980 | 5/1984 | European Pat. Off. . |
| 91/02185 | 2/1991 | WIPO . |
| 93/18329 | 9/1993 | WIPO . |

*Primary Examiner*—Eric K. Nicholson
*Attorney, Agent, or Firm*—Burns, Doane, Swecker & Mathis, LLP

[57] ABSTRACT

A threaded joint for an oil well pipe having (1) a tapered threaded having roughly the shape of a buttress thread, (2) a pin having a male thread and a box having a female thread, (3) a seal and a torque shoulder, characterized in that (i) the load flank angle of the threads is −20° or greater and less than 0°,
the stab flank angle is greater than 30° and at most 60°
(ii) there is a positive amount of interference between the male threads and the female threads, and
(iii) during and at the completion of make-up, the load flanks and the stab flanks are contacting each other, and there is a gap between the crests and the roots.

10 Claims, 7 Drawing Sheets

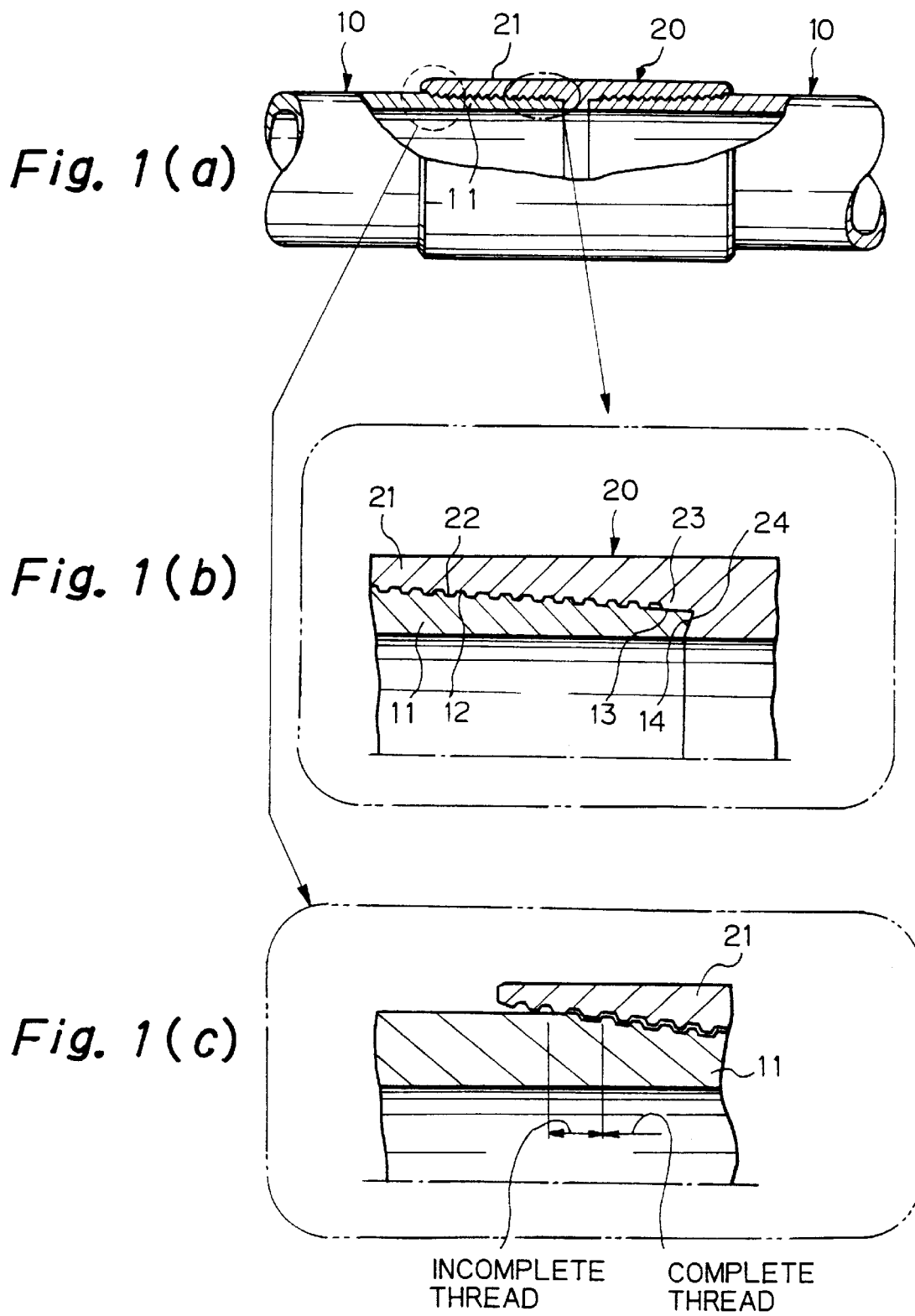

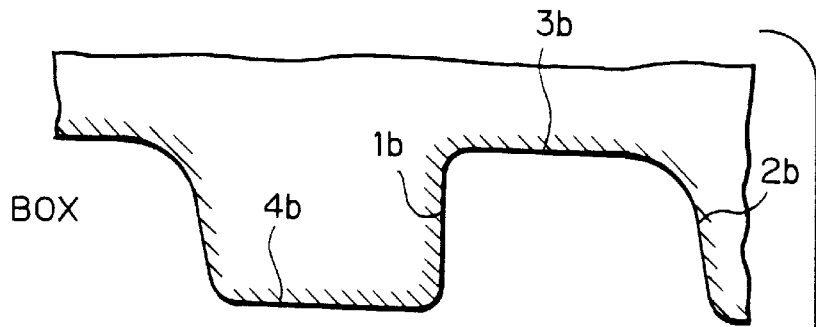
Fig. 2(a)
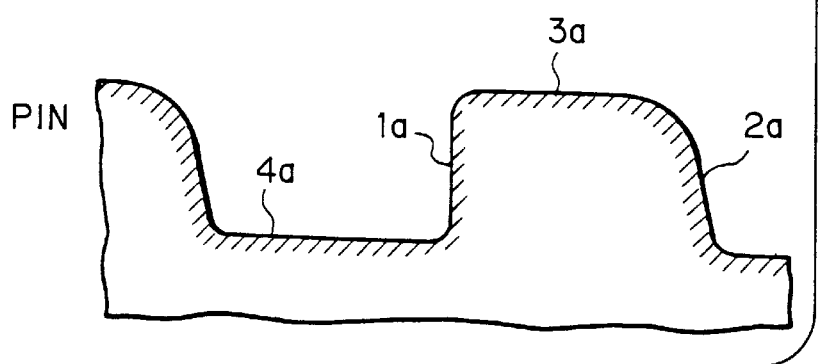
Fig. 2(b)
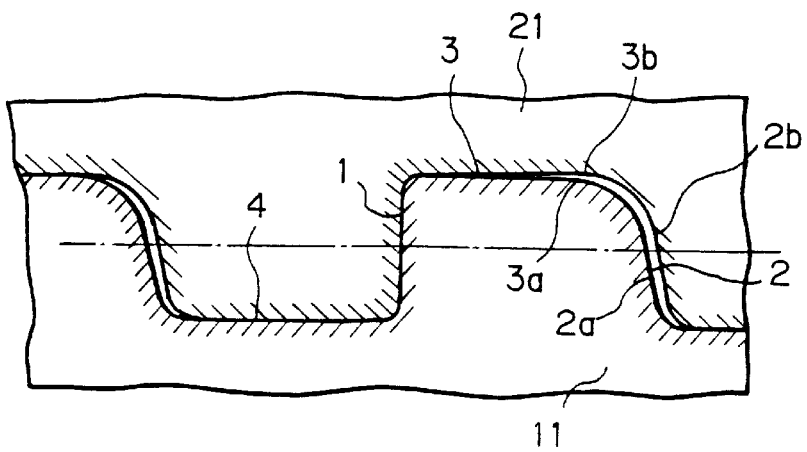

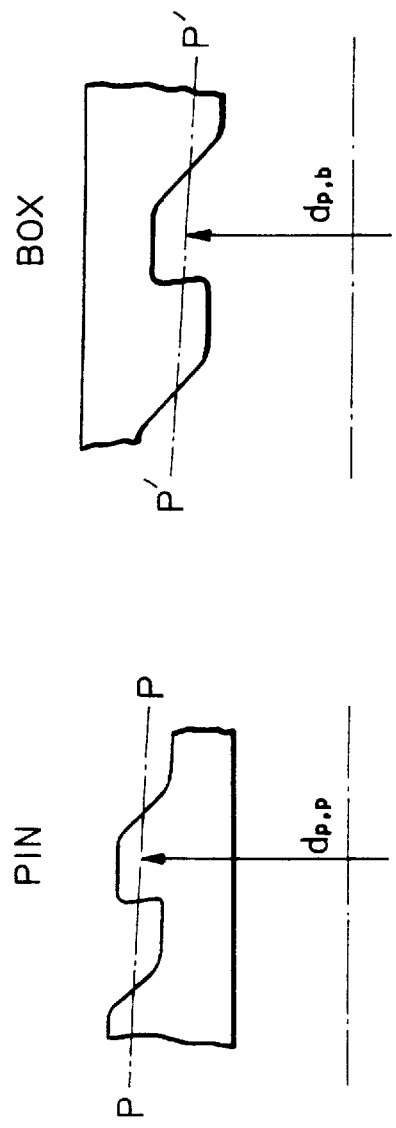

THREADED JOINT FOR OIL WELL PIPES

BACKGROUND OF THE INVENTION

This invention relates to a threaded joint for oil well pipes used for the exploration and production of natural gas and crude oil produced beneath the ground, and particularly to a threaded joint for oil well pipes suitable for use in deep wells and in severe corrosive environments.

Today, threaded joints are widely used as a means for connecting oil well pipes used in the exploration and production of natural gas fields and crude oil fields which may be at a depth of thousands of meters. Threaded joints for oil well pipes include integral types, in which a pin is formed on one end of a pipe and a box is formed on the other end and pairs of pipes are connected with each other, and coupling types in which a coupling having a box formed on each end is used and is connected to pipes having pins formed on both ends.

Oil well pipes are installed beneath the ground in wells and are used under high pressure, high loads, and bad environments. Therefore, various capabilities are demanded of such threaded joints, including (1) that they be able to withstand axial tensile forces due to the weight of pipes to which they are connected, (2) that they be able to withstand the internal pressure from fluids inside them, (3) that they not corrode due to the fluids inside them, and (4) that they be capable of being reused dozens of times. In recent years, wells have tended to become deeper, so the above requirements have been becoming more severe.

As a threaded joint for oil well pipes which can meet these demands, the structure shown in FIG. 1 of the coupling type having a seal portion and a torque shoulder has been much used, and many proposals have been made with respect to this structure.

FIG. 1(a) is a cross-sectional view showing two pipes 10 connected together by a coupling 20, and FIG. 1(b) and 1(c) are enlarged views of main portions thereof.

Namely, it is equipped with a pin 11 having a male thread 12 formed on the end of each pipe 10 and a box 21 having a female thread 22 provided within the coupling, and a seal is formed by contacting a tapered, seal-forming unthreaded portion 13 on the end of the pin 11 with a tapered seal-forming unthreaded portion 23 on the inside of the box 21. By forming a metal seal in this portion, the leak-tightness against the internal pressure of fluids within oil well pipes is increased.

A torque shoulder-forming unthreaded portion 14 formed on the end of the seal-forming unthreaded portion 13 of the pin 11 is abutted against a torque shoulder-forming unthreaded portion 24 formed inside of the seal-forming unthreaded portion 23 of the box 21 to form a torque shoulder. By the abutment between these unthreaded portions 14, 24, the tightening torque is adjusted to a suitable value so that a high sealing pressure producing excessive plastic deformation is not generated.

The threads used in these joints are so-called tapered threads which can be quickly joined at the work site. On the pin 11, for example, the outer diameter decreases towards the end. On the pin of the example of FIG. 1, as shown in FIG. 1(c), in the direction away from the end, the threads are cut upwards, and at the end of the threads there is a runout thread with incomplete threads.

Many proposals have been made for the shapes of tapered threads such as those described below. For the definitions of the load flank angle α and the stab flank angle θ, reference may be had to FIG. 4 to be described below.

(1) The buttress thread shown in FIG. 2 is prescribed by Standard 5B of the API (American Petroleum Institute). FIG. 2(a) shows the shape of the buttress thread, and FIG. 2(b) shows the state of contact between the male thread and female thread at the time of make-up. Due to the threaded engagement during make-up, thread load flanks 1 are formed by the load flanks 1a of the male thread and the load flanks 1b of the female thread, thread stab flanks 2 are formed by stab flanks 2a of the male thread and stab flanks 2b of the female thread, thread crest surfaces 3 are formed by the male thread crest surface 3a and the female thread root surface 3b, and root surfaces 4 are formed by the male thread root surface 4a and the female thread crest surface 4b.

An API buttress thread has a load flank angle of 3° and a stab flank angle of 10°. As shown in FIG. 2(b), at the time of make-up, there is contact along the thread load flanks 1, no contact along the thread stab flanks 2, and contact along at least one of the thread crest surface 3 and the thread root surface 4.

(2) A thread shape referred to as an improved buttress thread, shown in FIG. 3(a), is also used. This thread has a load flank angle of 0° and a stab flank angle of 45°. As shown in FIG. 3(b), at the time of make-up, there is contact along the thread load flanks 1 and the thread stab flanks 2, and gaps exist along the thread crest surfaces 3 and the thread root surfaces 4.

(3) In an example disclosed in U.S. Pat. No. 5,092,635, a threaded joint having a generally buttress-shaped thread is proposed in which the load flank angle is negative, and at the completion of make-up, there is contact along both the thread load flanks and the thread stab flanks. However, in that threaded joint, the amount of thread interference is 0 or negative, so at the completion of make-up, due to the axial force produced by the contact between the torque shoulders of the pin and the box, contact is produced along the load flanks and stab flanks of the threads, and during make-up, until the torque shoulders contact, only the stab flanks of the threads are contacting.

SUMMARY OF THE INVENTION

Threaded joints for oil well pipes using the above-described threads have the following problems.

Although the frequency of occurrence is not high, there are cases in which a compressive force acts in the axial direction of pipes. Subsequently, when a tensile load is applied due to the weight of the pipes, in the API buttress thread (1), the contact surface pressure in the seal portions and the torque shoulders decreases, and in extreme cases, a gap develops. This phenomenon decreases the leak-tightness with respect to fluids within oil well pipes, and not only does the problem occur that internal fluids can easily leak, but also the fluids may penetrate into the above gaps, and a great deal of corrosion may occur in the gaps.

Furthermore, when this phenomenon is occurring, if for some reason a twisting torque acts in the loosening direction, the joint can easily become disconnected, and there is the danger of the oil well pipe falling into the well. At this time, it is extremely difficult to reconnect the oil well pipes within the well, and in the worst case, it is necessary to abandon an oil well which is in the development stage or the production stage. This problem becomes more sever as the depth of a well increases, because the tensile forces due to the weight of the pipes increase.

These phenomena occur due to their being a gap at the stab flanks at the time of make-up. When a compressive force is applied, therefore, the threads are not subjected to the compressive load until this gap disappears, and compressive loads concentrate in the seal portion and torque shoulder. In these portions, extreme plastic deformation develops. Thus, when tensile forces subsequently act, since plastic deformation of the seal portion and the torque shoulders has already occurred, the contact surface pressure in these portions decreases, and the torque holding ability of the joint decreases.

In the improved buttress thread (2), when an excessive tensile force acts, there are cases in which a phenomenon called jump-out occurs in which the male thread separates from the female thread prior to tensile breakage of the pipe body. Jump-out is caused by relative sliding of the male and female threads in the radial direction producing separation, and the tensile performance of the joint becomes less than the tensile performance of the pipe body. Therefore, when this thread is applied to a well, if only the tensile performance of the pipe body is considered during design, this can lead to falling of the oil well pipe into the well due to the jump-out phenomenon and the same worst consequences as in (1) described above. If design takes into consideration the limit for producing the jump-out phenomenon in order to avoid it, material costs increase.

With the buttress thread (3) described in U.S. Pat. No. 5,092,635, the stab flanks of the threads contact at the completion of make-up of the joint, so the performance with respect to axial compressive forces is high, but there is a high danger of the same type of problem of loosening as described with respect to the API buttress thread (1). Namely, with this thread, there is no positive interference, so the make-up torque becomes relatively small, and if for some reason a torque is applied to the joint in the loosening direction, the joint can become disconnected with a relatively small torque and the pipe can easily drop into the well. If the make-up torque is increased in order to prevent this, excessive tightening of the joint may occur, leading to the problems that the seal portions and the torque shoulders are damaged, the sealing performance is decreased, and internal fluids can easily leak.

Accordingly, this invention was made in order to solve problems like those described above of conventional threaded joints for oil well pipes, and its object is to provide a threaded joint which has tensile performance superior to that of the pipe itself, which has excellent sealing performance even after a compressive load being applied, and which has a high resistance to a loosening torque.

A first invention is a threaded joint for oil well pipes having excellent tensile performance, leak-tightness, and resistance to a loosening torque of the type equipped with a pin having a male thread and a box having a female thread, each thread having a thread shape which is a roughly buttress thread shaped tapered thread, and in which a seal is formed by a seal forming unthreaded portion on the pin and a seal forming unthreaded portion formed on the box, and a torque shoulder forming unthreaded portion provided on the end of the pin and a torque shoulder forming unthreaded portion provided in the box are abutted to form a torque shoulder, characterized by the following (i) through (iii):

(i) the load flank angle a of the thread is −20° or above and less than 0° and the stab flank angle θ is greater than 30° and at most 60°, (ii) a positive thread interference exists between the male thread and the female thread, and (iii) the load flanks and the stab flanks of the male and female threads are contacting each other and there is a gap between the crests and the roots both during and at the completion of joint make-up.

A second invention is the above-described threaded joint for oil well pipes having even more superior tensile performance, leak-tightness, and resistance to loosening torque in which an upper limit for the thread interference is given by the smallest value calculated over the entire length of the thread using a formula based on characteristics (the yield strength and Young's modulus of the material, the dimensions of the joint) of the joint being used, and a lower limit is at most 5% of the upper limit.

Here, the amount of thread interference is defined by formula F or G which will be described later, for example, and is the difference between the diameters of the pitch circles of the male thread and female thread which mate with each other at the completion of joint make-up.

In determining the amount of thread interference in the second invention, formulas D and E which will also be described later are used. In these formulas, the values of the terms are values which do not consider deformation prior to make-up. The pitch diameter $d_p$, is the average of the pitch diameter $d_{p,p}$ of the male thread and the pitch circle diameter $d_{p,b}$ of the female thread. However, there are almost no changes in the results if either one of the values is used as a representative value.

BRIEF DESCRIPTION OF THE DRAWINGS

FIG. 1(a) is a longitudinal cross-sectional view of the basic structure of a threaded joint for oil well pipes of the coupling type, and FIGS. 1(b) and (c) are enlarged views of portions thereof.

FIG. 2(a) is a longitudinal cross-sectional view showing the shape of buttress threads defined by API standards, and FIG. 2(b) is an explanatory view showing the thread surface contact state at the completion of make-up.

FIGS. 5(a) to (c) are explanatory views showing the definition of thread interference amount.

DETAILED DESCRIPTION OF THE PREFERRED EMBODIMENTS

Next, the reasons why the shape of a threaded joint according to the present invention is limited in the above manner along with the operation of the joint will be described in detail.

Here, the terminology used in the specification to define the invention will be explained.

Figure 3A:
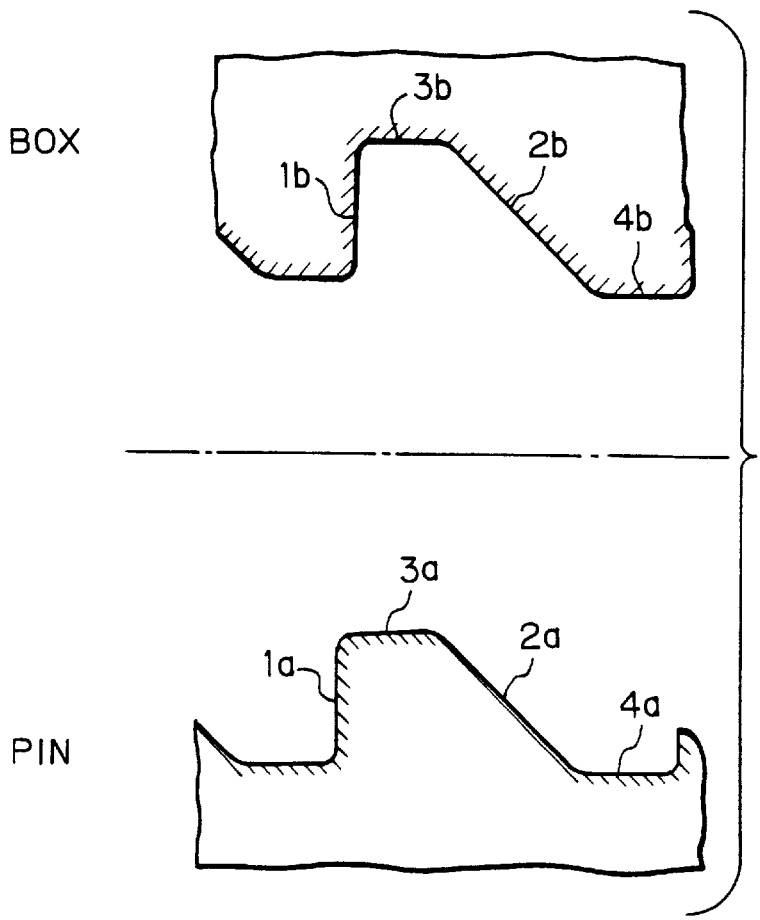
FIG. 3(a) is a longitudinal cross-sectional view showing the shape of an improved buttress thread.
Figure 3B:
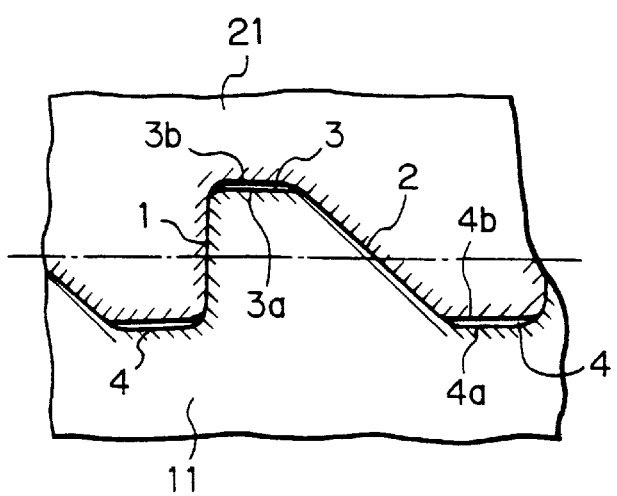
FIG. 3(b) is an explanatory view showing the state of thread surface contact at the completion of make-up.
Figure 4:
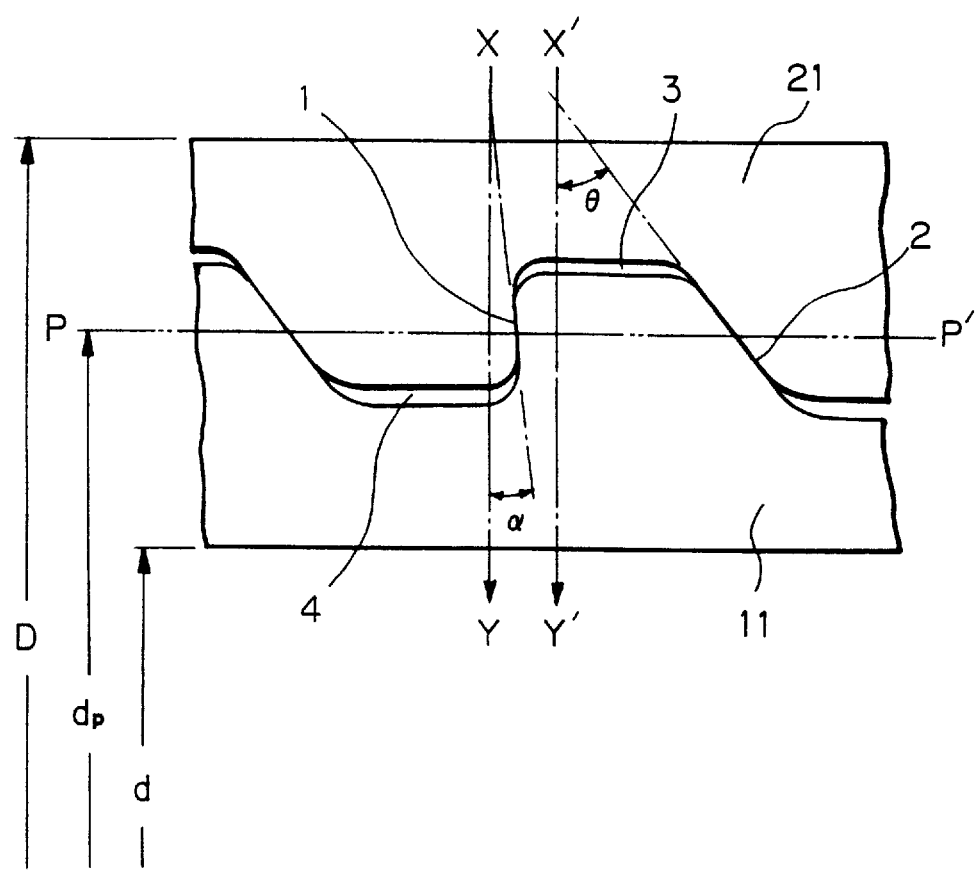
FIG. 4 is an explanatory view showing the thread shape of a threaded joint of the present invention and the state of thread surface contact during and at the completion of make-up.

First, the load flank angle a and the stab flank angle θ of a buttress thread will be defined based on FIG. 4 which shows the thread shape of a threaded joint according to the present invention as well as the thread surface contact during make-up and at the completion of make-up.

The load flank angle and the stab flank angle are positive or negative angles measured respectively with respect to lines X-Y and X'-Y' extending perpendicular to an unillustrated pipe axis. The load flank angle α is a negative angle measured in the counterclockwise direction, and the stab flank angle θ is a positive angle measured in the counterclockwise direction.

Next, the definition of the thread interference will be explained with reference to FIG. 5.

As shown in FIGS. 5(a) and (b), in a tapered thread used in a threaded joint for oil well pipes, if one looks at one crest of the male thread (the pitch diameter of this crest is indicated by $d_{p,p}$ and the pitch diameter of the root of the corresponding female thread is indicated by $d_{p,b}$), as a result of the tightening of the threads, the one root of the female thread of the box which engages with the crest of the male thread gradually moves towards the inner side of the box, and the pitch diameter of the female thread root $d_{p,b}$ decreases. This decrease is finally limited by contact between the torque shoulder of the box and the torque shoulder of the pin. Here, the thread interference amount δ is the difference between the pitch diameter of the male thread crest and the pitch diameter of the female thread root which finally engage with each other, i.e., they are mating with each other at the completion of make-up, and is defined by the following formula(F).

$$\delta = d_{p,p} - d_{p,b} \tag{F}$$

As shown in FIG. 5(c), when the pin and the box have the same thread taper Tt, the amount of thread interference is the same over the entirety of the thread and is given by the following formula (G).

$$\delta = (LB-LP)/Tt \tag{G}$$

wherein

LB: distance from a reference position on the thread of the box to the end of the torque shoulder LP: distance from a reference position on the thread of the pin to the end of the torque shoulder Tt: thread taper The reference position of the threads is a position in the longitudinal direction of the pipe at which the pitch diameters for each of the threads of the pin and the box are equal to each other. For example, as shown in FIG. 1(c), when the thread of the pin is a runout thread, the location where a complete thread starts (here, the pitch diameter is the difference between the outer diameter of the pipe and the thread height) can be used. The above-described dimensions (pitch diameter, thread taper, etc.) are initial values which do not take into consideration deformation during joint make-up.

The reasons for the restrictions on the shape according to the present invention are based on the following operating principles of a threaded joint when a tensile force and a compressive force are applied.

(1) At the completion of make-up of the threads, if there is a gap between the stab flanks of the threads, when a compressive force is applied, the male thread and the female thread move with respect to each other in the axial direction, and until the gap disappears, the threads are not subject to the compressive load. For this reason, most of the compressive load is concentrated on the seal portion and the torque shoulder, and large plastic deformation occurs in these portions. Thereafter, when a tensile load is applied due to the weight of the oil well pipes, the male and female threads move in the opposite directions, and a gap again forms between the stab flanks of the threads. At this time, due to the plastic deformation of the seal portion and the torque shoulder, the contact surface pressure decreases, and in the worst case, a gap develops at the seal portion and/or the torque shoulder.

(2) In order to prevent this, it is necessary to have contact between the stab flanks of the threads at the completion of make-up, but if the stab flank angle at this time is small, the contact surface pressure of the threads becomes high, and it is easy for seizing to occur. For this reason, it is necessary for the stab flank angle to be above a certain value.

(3) The load flank angle of the threads has an effect on the tensile performance of a joint. In order to prevent jumpout from occurring even when an excessive tensile force is applied, it is necessary to make the load flank angle a negative value. However, if too negative a load flank angle is employed, the stress concentrations at the root corner of the thread become too great, leading to early breakage of the root corner, so a moderately negative angle must be used.

(4) By making the thread interference defined by the difference between the pitch diameters of the male thread and the female thread when the threads are engaged with each other at the completion of make-up a positive value, the make-up torque of the joint can be increased and loosening of the joint can be prevented.

Based on this behavior of a threaded joint, the shape of a threaded joint for oil well pipes according to the present invention is set as follows.

First, in order to guarantee the tensile performance of the joint, the load flank angle a of the threads is −20° or greater and less than 0°. Preferably, it is −10° or greater and at most −3°.

Figure 6:
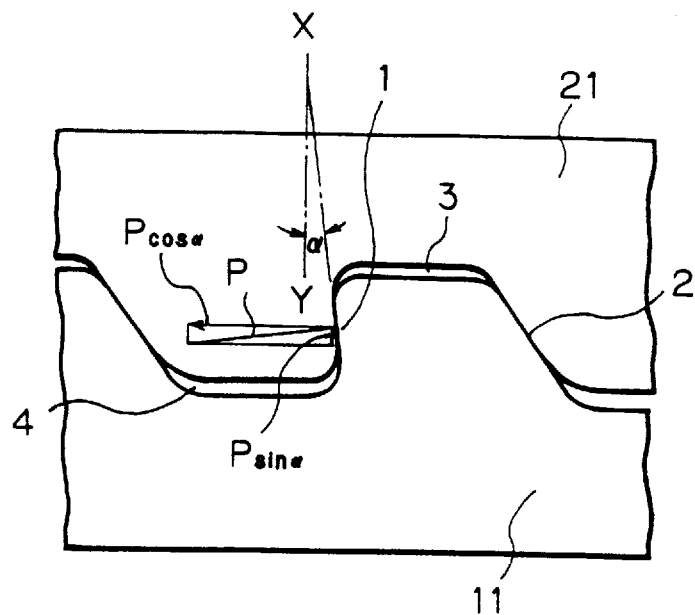
FIG. 6 is an explanatory view showing the load condition of an axial tensile force on the thread load flank.

FIG. 6 is an illustration showing the load condition of a thread load flank 1 under a tensile load applied to a threaded joint formed from a pin 11 and a box 21. Due to the tensile load, a normal force P acts on the load flank 1. This force P can be resolved into an axial component Pcosα and a radial component Psinα. When a is negative, the radial component Psinα is directed downwardly in the figure and acts to press the male thread towards the female thread, so it suppresses the occurrence of jump-out.

At this time, the axial component Pcosα is simultaneously applied, inclination of the thread crests due to elastic deformation occurs, so the angle α is greater than the load flank angle by the amount of inclination of the thread crests. For this reason, it is necessary for the load flank angle to be a negative value taking the amount of inclination of the thread crests into consideration, or in other words it must be less than 0°.

If the load flank angle is made more negative, the radial component Psinα increases, so the jump-out suppressing effect increases. However, if it becomes more negative than −20°, stress concentrations at the root corner of the thread become too great, leading to early breakage of the thread root corner and decreasing the tensile performance of the thread. Therefore, the load flank angle is −20° or greater.

Thus, the load flank angle a according to the present invention is −20° or greater and less than 0°. In order to further attain both jump-out suppression and suppression of stress concentrations, the load flank angle α is preferably −10° or greater and at most −3°.

In the present invention, the stab flank angle θ of the threads is preferably greater than 30° and at most 60°. This is in order to prevent seizing of the threads at the time of joint make-up and to maintain the compressive performance of the joint.

Figure 7:
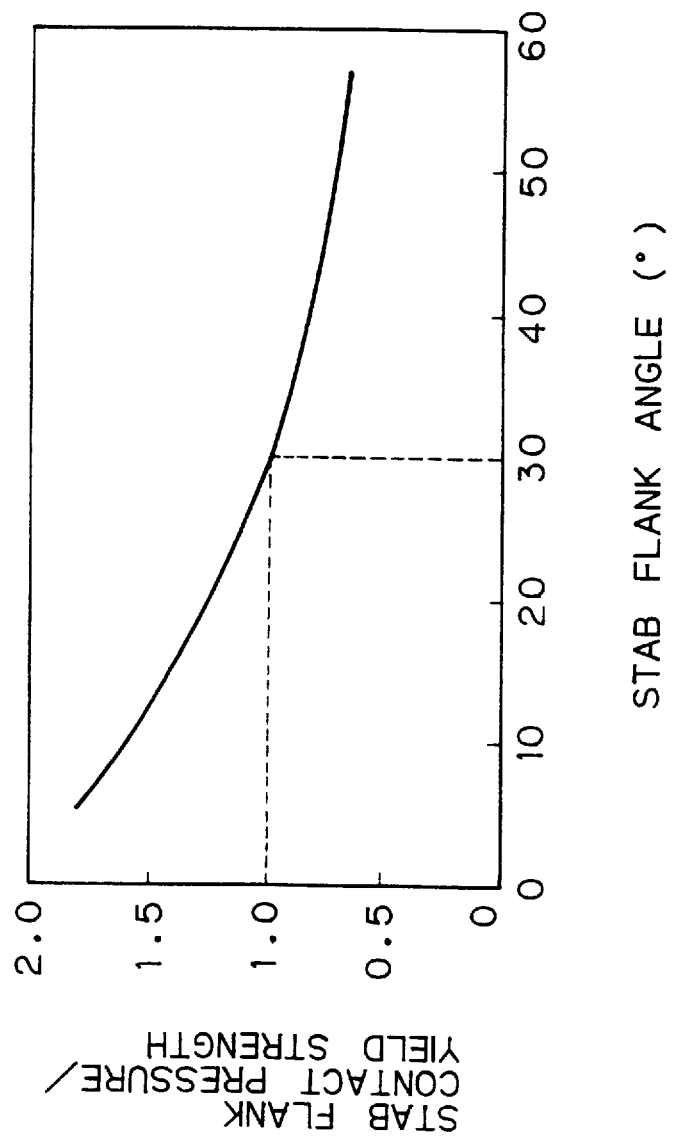
FIG. 7 is a view showing the effect of stab flank angle on the ratio between the contact pressure on the stab flank generated at the completion of make-up and the yield strength of the material.

FIG. 7 is a graph showing how the ratio between the contact pressure at the stab flanks of the threads at the completion of make-up of the joint to the yield strength of the material varies with changes in the stab flank angle θ. When there is contact along both the load flanks and the stab flanks of the threads as in the joint of the present invention, the ratio of the stab flank contact pressure to the yield strength increases as the stab flank angle decreases, and when the stab flank angle is 30° or less, the contact pressure exceeds the yield strength of the material, so the danger of seizing of the threads is high.

Figure 8:
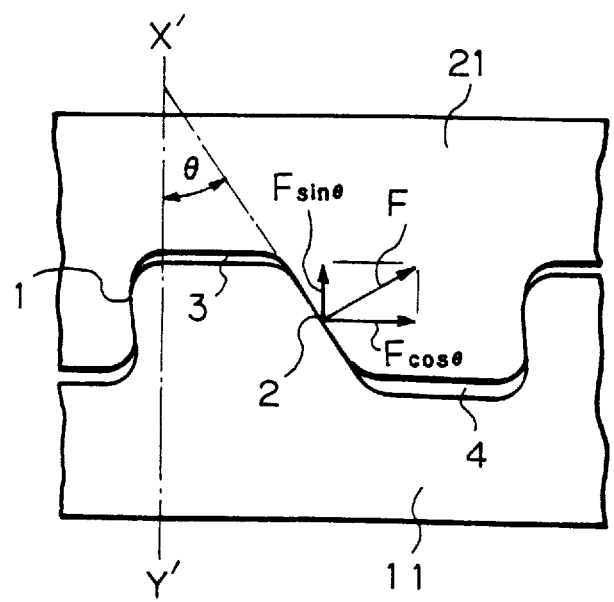
FIG. 8 is an explanatory view showing the load condition of an axial compressive force on the thread stab flank.

FIG. 8 is an explanatory diagram showing the load condition on the stab flank of a thread of a joint subjected to an axial compressive force and comprising a pin 11 and a box 11. When a compressive force is applied, a normal force F is applied to the stab flanks 2 of the threads. This force F can be resolved into an axial component Fcosθ and a radial component Fsinθ. An external compressive force applied to the joint is applied to the stab flanks solely as the axial component Fcosθ. Therefore, as the flank angle θ increases, the compressive force applied to the stab flanks 2 decreases, and by this amount, a compressive force acts on the seal and the torque shoulder. This is the same as the problem of a conventional joint described above and causes plastic deformation of the seal and the torque shoulder. In order to prevent this, the flank angle is preferably at most 60°.

Thus, in the present invention, the stab flank angle θ of the threads is greater than 30° and at most 60°, but in order to more reliably prevent seizing and improve compressive performance, the stab flank angle θ is preferably in the range from 35° to 45°.

Next, the amount of thread interference is made a positive value according to the present invention, i.e., a prescribed amount of thread interference is imparted, as stated previously, in order to impart a degree of torque to the threads even during make-up of the joint and to increase the make-up torque. As a result, even if a torque in the loosening direction acts on the joint for some reason, loosening of the joint can be prevented, so the joint can not be easily disconnected, and the danger of the oil well pipe falling into the well can be prevented successfully. Here, the thread interference, as mentioned before, is defined as the difference between the pitch diameters of the male thread and the female thread which mate with each other at the completion of make-up of a joint.

The amount of thread interference is determined based on the dimensions of the joint being used. One example is shown below.

The following formulas A, B, and C show the stress σ generated in the pin and the box at the completion of make-up as a function of the amount of interference δ. Here, formula A gives the stress $\sigma_p$ in the pin, formula B gives the stress $\sigma_b$ in the box, and formula C gives the coefficient $p_m$ in formulas A and B.

$$\sigma_p = -\frac{d_p^2(1 + d^2/4r^2)p_m}{L_m^2} \quad (A)$$

$$\sigma_b = \frac{D^2(d_p^2/4r^2 + d_p^2/D^2)p_m}{L_b^2} \quad (B)$$

$$p_m = \frac{\delta E}{2d_p(1 + d^2/L_a^2 + d_p^2/L_b^2)} \quad (C)$$

Here,
δ: thread interference (mm)
E: Young's modulus of joint material (kgf/mm²)
D: outer diameter of box (mm)
d: inner diameter of pin (mm)
$d_p$: pitch diameter of thread (mm)
r: radial distance from axis of joint (mm)
$L_a^2$: $d_p^2 - d^2$
$L_b^2$: $D^2 - d_p^2$ As is clear from formulas A and B, the stress generated at the completion of make-up is proportional to the amount of thread interference, so if the amount of thread interference δ is too great, the stresses ($\sigma_p$ and $\sigma_b$) acting on the pin and the box become too large, leading in extreme cases to plastic deformation caused by make-up of the joint. In order to prevent this, it is preferable to set an upper limit on the amount of thread interference in the following manner based on the yield strength $\sigma_y$ of the joint material.

The stresses given by formulas A and B depend on the radial distance r from the joint axis. In formula A, when r=d/2, and in formula B, when r=$d_p$/2, the stresses (as absolute values) are each a maximum. If the maximum stresses in formulas A and B are set equal to the yield strength $\sigma_y$ of the joint material and the amount of thread interference δ is calculated, the following formulas D and E are obtained.

$$\delta = \frac{\sigma_y L_a^2 (1 + d^2/L_a^2 + d_p^2/L_b^2)}{E d_p} \quad (D)$$

$$\delta = \frac{2\sigma_y L_b^2 d_p (1 + d^2/L_a^2 + d_p^2/L_b^2)}{E(D^2 + d_p^2)} \quad (E)$$

Here, the pitch diameter $d_p$ of the threads is the average of the pitch diameter $d_{p,p}$ of the male thread and the pitch diameter $d_{p,b}$ of the female thread which mate with each other at the completion of make-up, but the result is nearly the same if one or the other value is used instead.

The upper limit on the amount of thread interference is the smallest value obtained from formulas D and E. Here, the smallest value varies linearly with the pitch diameter for a tapered thread, so it is the smallest value calculated from formulas D and E over the entire length of the threads. Normally, the structure of the threads is as shown in FIG. 1 with the thickness decreasing towards the ends of the pin and the box, so the thread interference is a value calculated based on the dimensions at the ends.

If the amount of thread interference is too small, the contact pressure at the completion of make-up will be small, and an appropriate torque in the threads cannot be generated. Therefore, the lower limit on the amount of thread interference is made 5% of the upper limit of the amount of thread interference.

One reason for providing contact along both thread load flanks 1 and thread stab flanks 2 of the male and female threads during make-up and at the completion of make-up is to guarantee compressive performance of the joint. Namely, even if a compressive force acts on the joint, the male and female threads do not move with respect to each other in the axial direction, and the compressive force can be applied to the threads. As a result, the effect of the stab flank angle restricted in the above manner can be fully obtained.

Another reason is that by contacting the load flanks and the stab flanks even during make-up, the contact pressure on the thread surfaces can be increased to a suitable value, the make-up torque at the completion of make-up can be maintained at a high value, and loosening of the joint can be prevented.

One of the characteristics of a joint according to the present invention, as shown for example in FIG. 6, is the presence of a gap along the crests 3 and the roots 4 of the threads. By allowing grease or other lubricant used during joint make-up to permeate these gaps, seizing of the threads is prevented, and because these gaps extend helically to the outside, air which is sealed off because of the contact between the seal portions of the pin and the box can pass along these gaps and escape to the outside. In other words, it is sufficient for the shape and size of the gaps along the crests 3 and the roots 4 to be such as to produce this effect. For example, in FIG. 6, the longitudinal cross-section is roughly buttress-shaped over the entire length, and the size of the gaps, i.e., the height may be roughly 0.1 mm along both the crests and the roots.

The threads of the present invention can be classified as so-called buttress threads. By using this shape, compared to a triangular thread, the ratio of the thread height to the thread pitch can be decreased, and the joint efficiency (the critical cross-sectional area of the joint divided by the cross-sectional area of the pipe body) can be set at a corresponding higher value.

A joint according to the present invention may be a coupling-type joint, or it may be an integral joint. The above-described effects are the same with either type.

EXAMPLES

Next, the performance of a threaded joint according to the present invention will be explained based on embodiments. Using coupling-type joints having basically the structure shown in FIG. 1, the characteristics of the threads were varied as shown in Table 1 to obtain joints. At this time, the other characteristics of the threaded joints were as follows.

outer diameter of pipe: 177.8 mm
  wall thickness of pipe: 10.33 mm
  outer diameter of coupling: 194.5 mm
  material of pipe and coupling: 22 Cr stainless steel (yield strength: 56 kgf/mm$^2$)
  thread shape: buttress thread
  thread pitch: 5.08 mm
  thread taper: $\frac{1}{16}$
  thread height: 1.575 mm
  seal taper: $\frac{1}{10}$ These threaded joints were subjected to a repeated make-up test, to a simple tension test, and to a combined load test to evaluate their performance. In the repeated make-up test, lubricating grease was applied to the threads of a joint, and make-up and disconnection of the joint were repeated until seizing occurred. The maximum number of repetitions performed was 10. In the simple tension test, after the joint was made up, an axial tensile force was applied, and the location of breakage and the load at breakage were recorded.

In the combined load test, a joint was made up, an axial compressive force corresponding to 50% of the yield strength was applied to the pipe body, and then an axial tensile force equivalent to 80% of the yield strength was applied to the pipe body simultaneously with an internal pressure (according to API standards) of 80% of the yield strength, and the presence of leaks of internal pressure was investigated.

The results of the above tests are shown in Table 2.

As is clear from Table 2, the examples of the present invention all had good results, but there was a problem with respect to one of the tests for the comparative examples.

For example, for joint E, the load flank angle had a large negative value, so the threads broke under the simple tension test, and the breaking load was low. For joint F, the load flank angle was a positive value, so jump-out occurred during the simple tension test, and since a gap was present along the stab flanks, leakage occurred during the combined load test. For joint G, the load flank angle was not a negative value (less than 0°), so jump-out occurred during the simple tension test. For joint H, the stab flank angle was too large, and for joint I, there were gaps along the stab flanks, so leaks developed in each joint during the combined load test. For joint J, the stab flank angle was small, so seizing of the threads occurred during the repeated make-up test.

For joint K which had no thread interference, the disconnect torque was small compared to the present invention, and it was found that loosening of the threads could readily take place. In addition, in order to prevent loosening, joint K was made-up with a make-up torque which was increased to such a high level as those in the examples of the present invention. However, this time the make-up torque became too high for joint K, and leaks occurred during the compound make-up test.

In contrast, the examples of joints according to the present invention maintained a high disconnect torque, they had good results for each of the tests, and they were found to have excellent performance as joints.

These embodiments were of the coupling-type, but similar results were obtained with an integral type.

A threaded joint for oil well pipes according to the present invention has excellent tensile performance above that of the pipe body, excellent leak-tightness even after a compressive load, and high resistance to loosening torque. Therefore, it is fully capable of use in oil wells which are becoming increasingly deep.

TABLE 1

| Joint No. | Load Flank Angle (°) | Stab Flank Angle (°) | *Contact Between Threaded Surfaces | Thread Interference (mm) | Gap Between crest and root (mm) | Remarks |
|---|---|---|---|---|---|---|
| This invention | | | | | | |
| A | −3 | 35 | a | 0.3 | 0.1 | |
| B | −5 | 40 | a | 0.3 | 0.1 | |
| C | −10 | 45 | a | 0.4 | 0.1 | |
| D | −15 | 50 | a | 0.2 | 0.1 | |
| Comparative Examples | | | | | | |
| E | −25** | 45 | a | 0.4 | 0.1 | |
| F | 3** | 10** | b** | 0.2 | 0** | API standard thread |
| G | 0** | 45 | a | 0.3 | 0.1 | Improved buttress |
| H | −5 | 65** | a | 0.2 | 0.1 | |
| I | −5 | 45 | b** | 0.3 | 0** | |
| J | −3 | 30** | a | 0.4 | 0.1 | |
| K | −13 | 25** | a | none** | 0.1 | U.S. Pat. No. 5,092,635 |

TABLE 1-continued

| Joint No. | Load Flank Angle (°) | Stab Flank Angle (°) | *Contact Between Threaded Surfaces | Thread Interference (mm) | Gap Between crest and root (mm) | Remarks |
| --- | --- | --- | --- | --- | --- | --- |

*a = contact along both load flanks and stab flanks
b = contact along load flanks, no contact along stab flanks
**Outside tile range of the present invention

TABLE 2

| Joint No. | Disconnect Torque (kgf-m) | Repeated Make-Up Test | *Simple Tension Test | Combined Load Test | Remarks |
| --- | --- | --- | --- | --- | --- |
| This Invention | | | | | |
| A | 2100 | ≧10 times | 332(pipe body) | no leaks | |
| B | 2020 | ≧10 times | 335(pipe body) | no leaks | |
| C | 2210 | ≧10 times | 331(pipe body) | no leaks | |
| D | 1950 | ≧10 times | 333(pipe body) | no leaks | |
| Comparative Examples | | | | | |
| E | 2840 | ≧10 times | 312(threads) | no leaks | |
| F | 1300 | ≧10 times | 319(jump-out) | leaks | |
| G | 1810 | ≧10 times | 325(jump-out) | no leaks | |
| H | 1760 | ≧10 times | 336(pipe body) | leaks | |
| L | 1310 | ≧10 times | 332(pipe body) | leaks | |
| J | 2230 | 5 times | 335(pipe body) | no leaks | |
| K | 1460 | ≧10 times | 329(pipe body) | no leaks | |

*Load at breakage (tons) and location of breakage

What is claimed is:

1. A threaded joint for oil pipes, which comprises a pin having a male thread and a box having a female thread, the male thread of the pin having a male thread crest possessing a pitch diameter and the female thread of the box having a female thread root possessing a pitch diameter, each thread being a tapered thread having a substantially buttress-type thread form, a seal being formed by metal-to-metal contact between an unthreaded portion on the pin and an unthreaded portion formed on the box, and a torque shoulder being formed by an unthreaded portion provided on an end of the pin abutted to an unthreaded portion on an inside of the box, wherein:

the load flank angle of the female and male threads is −20° or above and less than 0°;
the stab flank angle of the male and female threads is greater than 30° and at most 60°;
a positive thread interference between the male and the female threads exists, with said positive thread interference being defined as the pitch diameter of the male thread crest being greater than the pitch diameter of the female thread root; and
after hand-tight stubbing in joint make-up, the load flanks and the stab flanks of the male and female threads contact each other with a gap between the crests and the roots.

2. A threaded joint for an oil well pipe as described in claim 1 wherein the load flank angle of the male and female threads is −10° or above and −3° or less.

3. A threaded joint for an oil well pipe as described in claim 1 wherein, the stab flank angle of the male and female threads is between 35° and 45°.

4. A threaded joint for an oil well pipe as described in claim 1 wherein the gap between the crests and the roots is about 0.1 mm.

5. A thread joint for oil pipes, which comprises a pin having a male thread and a box having a female thread, each thread being a tapered thread having a substantially buttress-type thread form, a seal being formed by metal-to-metal contact between an unthreaded portion on the pin and an unthreaded portion on the box, and a torque shoulder being formed by an unthreaded portion provided on an end of the pin abutted to an unthreaded portion on an inside of the box, wherein:

the load flank angle of the male and female threads is −20° or above and less than 0°;
the stab flank angle of the male and female threads is greater than 30° and at most 60°;
after hand-tight stubbing in joint make-up the load flanks and the stab flanks of the male and female threads contact each other, and a gap exists between the crests and the roots;
a positive interference between the male and the female threads exists;
and an upper limit of the thread interference amount δ is given by the smallest value calculated using the following formula D or E over the entire length of the thread, and a lower limit is at most 5% of the upper limit:

$$\delta = \frac{\sigma_y L_a^2 (1 + d^2/L_a^2 + d_p^2/L_b^2)}{E d_p}$$

$$\delta = \frac{2\sigma_y L_b^2 d_p (1 + d^2/L_a^2 + d_p^2/L_b^2)}{E(D^2 + d_p^2)}$$

wherein
δ: thread interference (mm)
$\sigma_y$: yield strength of joint material (kgf/mm²)
E: Young's modulus of joint material (kgf/mm²)

D: outer diameter of box (mm)

d: inner diameter of pin (mm)

$d_p$: pitch diameter of thread (mm)

r: radial distance from axis of joint (mm)

$L_a^2$: $d_p^2 - d^2$ $L_b^2$: $D^2 - d_p^2$.

6. A threaded joint for an oil well pipe as described in claim 5 wherein the load flank angle of the male and female threads is −10° or above and −3° or less.

7. A threaded joint for an oil well pipe as described in claim 5 wherein the stab flank angle of the male and female threads is between 35° and 45°.

8. A threaded joined for an oil well pipe as described in claim 5 wherein the gap between the crests and the roots is about 0.1 mm.

9. A threaded joint for oil well pipes as described in claim 5, wherein the load flank angle of the male and female threads is −10° or above and −3° or less, and the stab flank angle of the male and female threads is between 35° and 45°.

10. A threaded joint for an oil well pipe as described in claim 5, wherein the lower limit of the thread interference is 5% of the smallest thread value.

* * * * *